Dec. 12, 1933. E. C. FRITTS 1,939,208
RECORDING MACHINE CAMERA SUPPORT
Filed Dec. 20, 1929 2 Sheets-Sheet 1
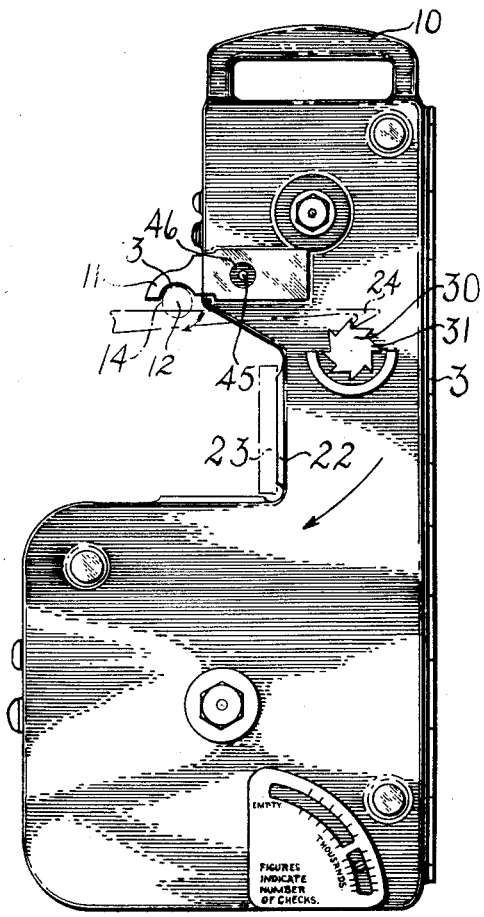
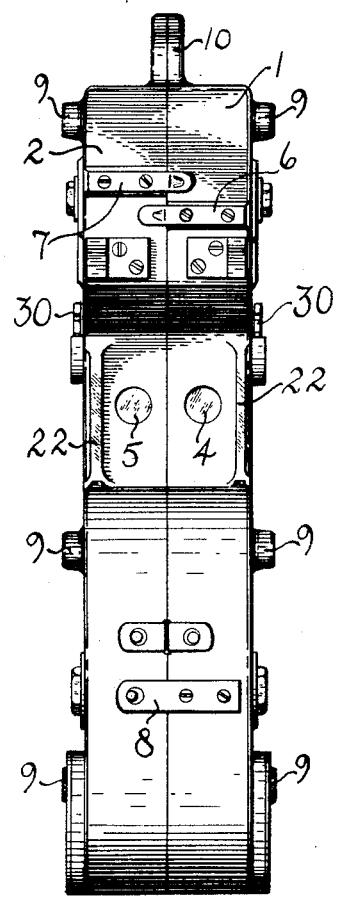
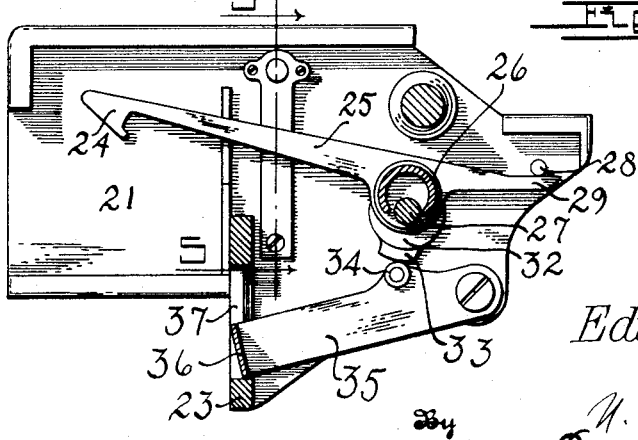
Inventor
Edwin C. Fritts,
By
Attorneys Dec. 12, 1933.  E. C. FRITTS  1,939,208
RECORDING MACHINE CAMERA SUPPORT
Filed Dec. 20, 1929  2 Sheets-Sheet 2
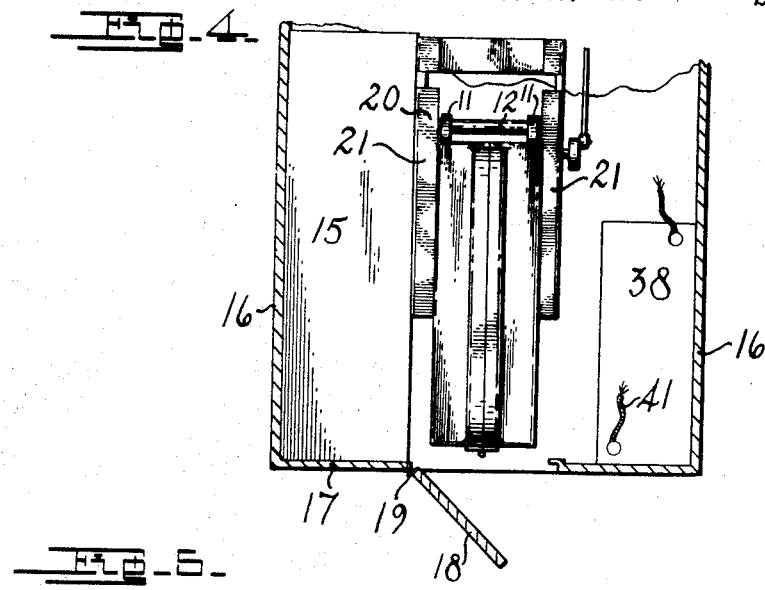
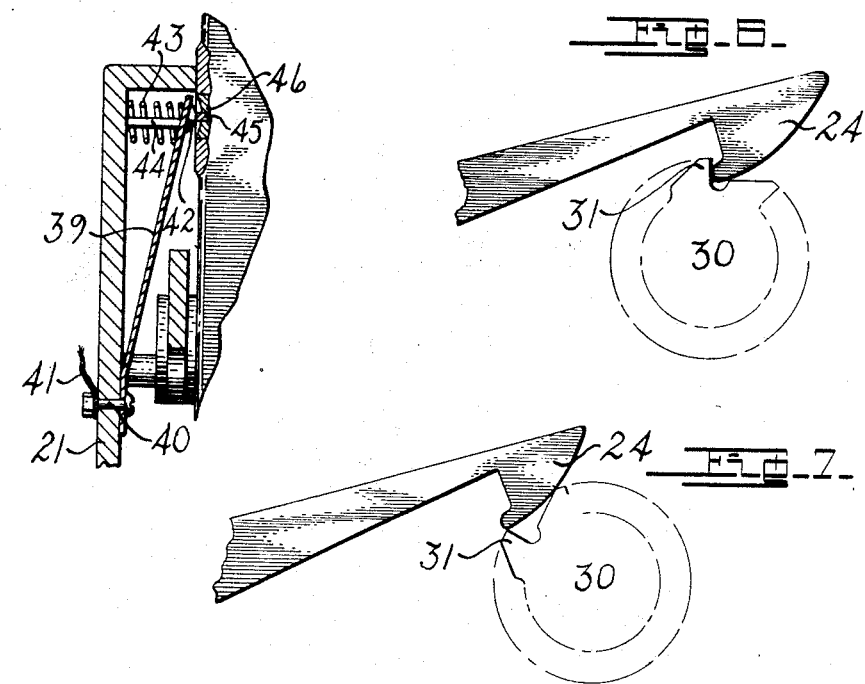
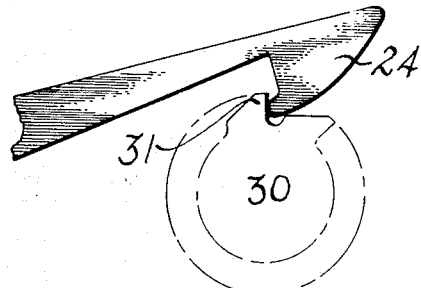
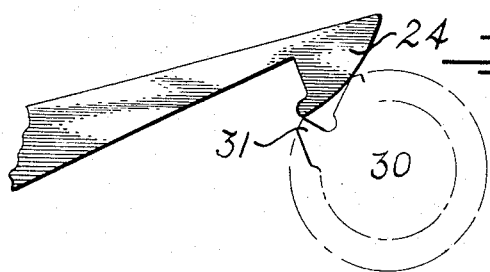
Inventor
Edwin C. Fritts, Patented Dec. 12, 1933

1,939,208

UNITED STATES PATENT OFFICE 1,939,208

RECORDING MACHINE CAMERA SUPPORT

Edwin C. Fritts, Rochester, N. Y., assignor to Eastman Kodak Company, Rochester, N. Y., a corporation of New York Application December 20, 1929
Serial No. 415,461

13 Claims. (Cl. 88—17)

This invention relates to photography and more particularly to photographic recording machines such as are sometimes used for making a record of checks or other documents. One object of my invention is to provide a recording machine with a simple connection between the camera and the machine base which will facilitate positioning the camera insuring proper registration of the parts and which consists of a pair of co-operating members which may be easily engaged and disengaged by an operator. Another object of my invention is to provide a simple type of support arranged to position the camera properly without attention from an operator. Another object of my invention is to provide a support through the engagement of which other co-operating parts on the camera and on the support are properly positioned, and other objects will appear from the following specification, the novel features being particularly pointed out in the claims at the end thereof.

The camera is of the type shown in U. S. Patent No. 1,730,930—Fritts, October 8, 1929. For the film supporting and moving mechanism reference may be had to this patent.

Coming now to the drawings wherein like reference characters denote like parts throughout,—

Fig. 1 is a side elevation of a camera showing diagrammatically parts of a support for positioning the camera in the recording apparatus in accordance with my invention;

Fig. 2 is a front elevation of the camera removed from the recording machine;

Fig. 3 is a side elevation partly in section of a power drive for actuating the movable parts of the camera;

Fig. 4 is a plan view of a portion of a recording machine equipped with a camera support constructed in accordance with and illustrating a preferred embodiment of my invention;

Fig. 5 is a fragmentary detail partially in section showing a contact which is made by positioning the camera upon its support; and Figs. 6 and 7 are similar views but with the parts in different positions of the power drive and connecting ratchet through which movement is transmitted to the movable camera parts.

As indicated in Fig. 1, the camera may be of the duplex type having a body consisting of two sections 1 and 2 hinged together at 3. Each of these sections constitutes a camera as there are a pair of objectives 4 and 5 and separate film moving and winding mechanisms as indicated in my patent above referred to.

The camera sections may be held together by means of suitable latches 6, 7 and 8 and are preferably provided with a series of raised pads 9 on the sides which will space certain camera parts away from a table or other object on which the camera may be laid when removed from the recording machine. A handle 10 is provided on top of the camera to facilitate handling. As thus far described, the camera structure is similar to that shown in my patent above referred to and either one or both of the cameras may be used at one time. If desired, only a single camera can be employed, although for a good many purposes it is desirable to have two copies made of each document.

Coming now to my invention, the camera may be supported upon the recording machine by means of co-operating parts 11 and 12. In the present instance, I prefer to form these co-operating parts in the shape of hooks 11 adapted to engage a hook supporting member such as a round rod 12. The shape of these co-operating parts is not important except that it is desirable to have a shape which will register the two parts, such as the rounded co-operating edges 13 of the hook and 14 of the rod.

Referring to Fig. 4 where the recording machine body is diagrammatically illustrated at 15 as consisting of side walls 16 and a rear wall 17 in which there is a door 18 hinged at 19 which permits access to the interior of the machine and particularly to the supporting structure indicated broadly at 20.

The rod 12 is here shown as extending between a pair of side plates or castings 21 which are spaced apart a distance sufficient to permit the camera to slide freely between the sides thereof. The hooks 11 of the camera are shown in position engaging the rod 12.

The camera is supported within the machine by hooks 11 and rod 12. The hooks 11, with the camera in vertical position, are horizontally and vertically displaced from the center of gravity of the camera so that the camera tends to swing about the rod 12 in the direction of the arrow in Fig. 1. Machined bosses 22 on sections 1 and 2 of the camera abut a fixed plate 23 located in the machine so that the camera is properly positioned in the machine, preferably in a vertical position. It should be noted that the support for the camera is provided for all practical purposes solely by hooks 11 and rod 12, whereas the height of bosses 22 and location of fixed plate 23 determine the position assumed by the camera between the side plates 21 with respect to the machine. Thus, the camera may be loaded into the machine by engaging hooks 11 and rod 12 to support the camera and permitting gravity to swing the camera around rod 12 until bosses 22 abut fixed plate 23 to properly and accurately position the camera.

In Fig. 3 an inside view of a side plate 21 is shown. Each of these side plates is, in effect, a shallow box in which is mounted a series of parts. First, the means for transmitting power to the movable parts of the camera consists of a hook-like member 24 which is carried by an arm 25 on an eccentric 26 turned by a power drive shaft 27. A pin 28 contacting with a tail 29 on the arm 25 limits the movement of the hook.

When the camera is swung into position on its support, the hook 24 snaps over a ratchet wheel 30 on the side of the camera. As the hook is oscillated by the eccentric 26 through movement of shaft 27, the hook 24 engages one tooth 31 at a time of the ratchet and intermittently moves the parts which are not shown in this application but which can be found in the duplex camera patent above referred to.

The shaft 27 also turns another eccentric 32 which carries a cam 33 contacting with a roller 34 on an arm 35 bent over at 36 to form a bar extending in front of the objectives 4 and 5. Thus, each time the shaft 27 turns one revolution, the shutter is moved up and down and permits an exposure to be made through one or both objectives 4 or 5. The shutter member 36 lies across an opening 37 in the fixed plate 23 which also serves to locate the camera by contacting with the bosses 22 as above referred to. Thus, the bosses 22 resting on the edges of the fixed surface 23 form a substantially light-tight joint between the camera and its support. Of course, as the camera is located inside of the recording machine cabinet, precautions are not necessary to prevent light from entering, since the cabinet of the recording machines excludes practically all extraneous light.

There is an electrically actuated signal system in the camera which indicates automatically when the film is not passed through the camera properly or when the film becomes exhausted in order to connect up a circuit through the camera with a source of power, such as a battery, as shown at 38 in Fig. 4. There is an automatic switch member, best shown in Fig. 5.

A spring arm contact 39 is shown as fastened to a side plate 21 by means of a screw 40 to which is connected one of the wires 41 leading to the battery 38. The end of the arm 40 carries a rounded protuberance 42 normally pressed outwardly by means of a spring 43 which surrounds a post 44. When the camera swings into place, a contact 45 which lies in an insulated housing 46 in the side of the camera wall, as shown in Fig. 1, comes into contact with the protuberance 42, so that a part of the circuit is made by this switch.

Since the circuits made by this switch and by other devices not herein described are disclosed in Patent No. 1,849,227 issued to me on March 15, 1932 and in my copending application Serial No. 415,463, both filed on even date herewith, these circuits will not be described in this application, it being only necessary for this application to include the means for making the circuit automatically when the camera is moved into position in the cabinet.

The operation of this camera support is extremely simple. It is only necessary to open the door 18 of the cabinet 15 and to grasp the handle 10 removing the camera by swing it about the shaft 12 in a counter-clockwise direction and lifting the hook 11 from engagement with the bar 12. This operation may cause the hooks 24 to turn the ratchets 30 a distance corresponding to a ratchet to tooth or from the position shown in Fig. 6 to that shown in Fig. 7 of the drawings. But since the camera is usually removed only when the film has been exposed, this movement is not important. As a matter of fact, it only moves a film a distance equal to one frame, so that the amount of film lost is negligible in case unexposed film does remain in the camera.

Loading the camera into the cabinet is equally simple. The handle 10 is grasped and the camera moved until the hook 11 is brought into engagement with the rod 12. By releasing the handle the camera swings by gravity until the bosses 22 strike the fixed surface 23 which holds the camera in a fixed position with respect to its support. As this movement takes place, the hook 24 is brought into engagement with the ratchet 30 and the contact 39 is brought into engagement with the contact 45, thus connecting up the operative parts of the camera with the power drive for these parts and making a circuit between the camera and a source of power located in the cabinet.

If by any accident the hooks 11 do not properly engage the supporting rod 12, the contact 42 will not lie in its proper position in contact with contact 45 and will, by striking a portion of the camera case, be grounded so the machine can not operate.

What I claim as my invention and desire to be secured by Letters Patent of the United States is:

1. In a photographic recording apparatus, the combination with a base including a feeding mechanism, a rod and a fixed plate, of a camera and a hook thereon, said hook being adapted detachably and rotatably to bear upon said rod and to support said camera in operative relation to said feeding mechanism and in abutting relation to said fixed plate.

2. In a photographic recording apparatus, the combination with a base including a feeding mechanism, a rod and a fixed plate, of a camera and a pair of spaced hooks on said camera and which are adapted detachably and rotatably to bear upon said rod and to support said camera in operative relation to said feeding mechanism and in abutting relation to said fixed plate.

3. In a photographic recording apparatus, the combination with a base including a feeding mechanism, a rod and a fixed plate provided with an aperture, of a camera including an objective and a hook on said camera, said hook being adapted detachably and rotatably to bear upon said rod and to support said camera in operative relation to said feeding means and in abutting relation to said fixed plate with said objective in registry with the aperture in said plate.

4. In a photographic recording apparatus, the combination with a base including a feeding mechanism and a fixed plate, of a rod mounted in said base between spaced walls, a camera adapted to slide between the walls to abut said fixed plate and hook-like projections on the camera adapted to engage said rod to support the camera.

5. In a photographic recording apparatus, the combination with a base, of a rod mounted thereon between spaced walls, a fixed surface on the base spaced from the rod, a camera adapted to slide between the walls, means on the camera for engaging the rod and supporting the camera, said camera being adapted to engage the fixed surface when mounted on the rod.

6. In a photographic recording apparatus, the combination with a base, of a projection extending therefrom, a fixed surface on the base spaced from the projection, a camera, a projection on the camera adapted to engage the base projection, said camera projection being arranged to one side of the center of gravity of the camera whereby said camera supported by the projections may normally swing into engagement with the fixed surface.

7. In a photographic recording apparatus, the combination with a base, of a camera adapted to be supported by the base, a suspension for the camera including a cooperating hook and hook support on the camera and base, a film drive for the camera, an actuating means on the base, said actuating means and film drive being adapted to be automatically engaged by bringing the cooperating hook and hook support into engagement.

8. In a photographic recording apparatus, the combination with a base, of a camera adapted to be mounted thereon, a supporting means, the camera comprising a cooperating hook and hook support on the several parts, film driving mechanism in the camera, a power drive on the base, said power drive and film driving mechanism becoming automatically engaged by supporting the camera through the hook and hook support.

9. In a photographic recording apparatus, the combination with a base including a rod and a fixed plate spaced from the rod, of means for supporting a camera in abutting relation to said fixed plate including a hook engaging said rod and contact means made only in the definite position of said camera.

10. In a photographic recording apparatus, the combination with a base including a rod, a fixed plate spaced from the rod and a resilient contact, of means for supporting a camera in abutting relation to said fixed plate including a hook engaging said rod and a contact on said camera abutting said resilient contact only during proper location of the camera.

11. In a photographic recording apparatus, the combination with a base including a rod, a fixed plate spaced from the rod and a resilient contact, of means for supporting a camera in abutting relation to said fixed plate including a hook engaging said rod and a contact on said camera abutting said resilient contact and adapted to complete a control circuit when the camera is in proper position.

12. In a photographic recording apparatus, the combination with a base including a rod and a fixed plate spaced from the rod, of a camera and a hook on the camera adapted detachably and rotatably to bear upon said rod and to suspend the camera in abutting relation to said fixed plate, said hook being located in spaced relation to a vertical line through the center of gravity of said camera while in abutting relation.

13. In a photographic recording apparatus, the combination with a base including a rod and a fixed plate spaced from the rod, of a camera and a hook on one side of the camera adapted detachably and rotatably to bear upon said rod and to suspend the camera in abutting relation to said fixed plate, said hook being located in spaced relation to a transverse vertical plane through the center of gravity of said camera while in abutting relation.

EDWIN C. FRITTS.